US006742712B1

(12) United States Patent
Kawaguchi et al.

(10) Patent No.: US 6,742,712 B1
(45) Date of Patent: Jun. 1, 2004

(54) INFORMATION CARD AND INFORMATION CARD SYSTEM

(75) Inventors: Eiji Kawaguchi, Fukuoka (JP); Richard Eason, Orono, ME (US); Kunihiro Tsuda, Fukuoka (JP)

(73) Assignee: ASA Systems, Inc., Fukuoka (JP)

( * ) Notice: Subject to any disclaimer, the term of this patent is extended or adjusted under 35 U.S.C. 154(b) by 0 days.

(21) Appl. No.: 09/806,653

(22) PCT Filed: Sep. 17, 1999

(86) PCT No.: PCT/US99/21663

§ 371 (c)(1),
(2), (4) Date: Jul. 23, 2001

(87) PCT Pub. No.: WO00/19365

PCT Pub. Date: Apr. 6, 2000

(30) Foreign Application Priority Data

Sep. 29, 1998 (JP) .......................................... 10-275513

(51) Int. Cl.[7] ............................................... G06K 19/06
(52) U.S. Cl. ....................................... 235/492; 235/380
(58) Field of Search ................................ 235/380, 492, 235/382, 487, 488, 494

(56) References Cited

U.S. PATENT DOCUMENTS

| | | | | | |
|---|---|---|---|---|---|
| 4,582,985 A | * | 4/1986 | Lofberg | ...................... | 235/380 |
| 4,879,747 A | * | 11/1989 | Leighton et al. | ............ | 235/382 |
| 5,027,401 A | * | 6/1991 | Soltesz | ....................... | 235/380 |
| 5,095,196 A | * | 3/1992 | Miyata | ....................... | 235/382 |
| 5,259,025 A | * | 11/1993 | Monroe et al. | ............... | 380/23 |
| 5,469,506 A | * | 11/1995 | Berson et al. | ............. | 235/380 |
| 5,636,292 A | * | 6/1997 | Rhoads | ....................... | 235/494 |
| 6,325,285 B1 | * | 12/2001 | Baratelli | ..................... | 235/380 |

* cited by examiner

*Primary Examiner*—Daniel St.Cyr
(74) *Attorney, Agent, or Firm*—Michael J. Persson; Kieth M. Blankenship; Lawson & Persson, P.C.

(57) ABSTRACT

An information card and card system that eliminates forgery and illegal use of a card. The information card includes a memory that stores information data, which includes one of image data and acoustic data and contains inherent data that is embedded in the information data according to steganographic information hiding. The inherent data is data that authenticates a legitimacy of a card owner of the information card. The information card system include the information card and a data processing terminal for authenticating the owner of the card and/or the authenticity of the card itself.

18 Claims, 7 Drawing Sheets

P

W

B

Wc

Bc

P*

INFORMATION CARD AND INFORMATION CARD SYSTEM

BACKGROUND OF THE INVENTION

1. Field to which the Invention Pertains

The present invention relates to an information card and an information card system. More particularly, it relates to an information card for use as a credit card, a cash-vending card, an ID card, etc. which employs Steganography, i.e., image data embedding digital watermarking, information-hiding, or digital picture envelope technology, and further to an information card system employing such an information card.

2. Description of Related Art

One known type of the information card is heretofore an IC card for use as, e.g., a credit card and an ID card. The IC card has an IC chip mounted on a plastic plate. The IC chip has either a microprocessor and a memory or a memory only. The IC card with the IC chip having both of the microprocessor and the memory is what is called an IC card, while the IC card with the IC chip having only the memory Is termed as a memory card.

The IC card for use as the credit card carries on its plastic plate surface the name of the card owner and the card number. The memory (ROM) in the IC chip stores an authentic program, a password, and so on. In some case, the authentication program and the password for use by the authentication program are encrypted for protection against unauthorized access.

However, such conventional IC cards do not have a significant level of security. More specifically, there have been cases where someone illegally obtains the password or decodes the encrypted data, and thereby illegally use the IC card. In addition, attempts have been made to forge the IC card as a whole. The use of such a forged IC card cannot be prevented once the password is obtained.

SUMMARY OF THE INVENTION

It is therefore an object of the present invention to provide an information card, which can completely be prevented from being forged, and an information card system Another object of the present invention is to provide an information card, which can completely be prevented from being illegally used, and an information card system.

The present invention provides an information card including a memory that stores information data, the information data including either image data or acoustic data, the improvement wherein the information data contains inherent data that is embedded in the information data according to Steganography. The information card may take a physical form as, e.g., an IC card or an optical card.

The present invention provides an information card wherein the inherent data shows either the legitimacy or card owner of the information card.

The present invention provides an information card wherein the memory stores a password for permitting the information data to be read from the memory.

The present invention provides an information card wherein the information card employs a customized key in order to give a permission to extract the inherent data from the information data. The customized key is data to control a flow of either an embedding program (encoder program) or an extracting program (decoder program). The customized key can be designed to allow only a legitimate card owner and authorized user of the information card to be aware of the customized key.

The present invention provides an information card system comprising: an information card including a memory that stores information data, the information data including either image data or acoustic data, the information data containing inherent data that is embedded in the information data according to steganography, the memory storing a password for permitting the information data to be read from the memory, and a data processing terminal including input means for submitting a password, password checking means for checking the submitted password against the password stored in the information card to permit the information data to be read from the memory, and output means for outputting the read information data. The data processing terminal can exchange data with the information card by wire or wireless in a contact or non-contact manner.

The present invention provides an information card system comprising an information card including a memory that stores information data, the information data including either image data or acoustic data, the information data containing inherent data that is embedded in the information data according to Steganography, and, a data processing terminal including input means for submitting a customized key, inherent data extracting means for extracting the inherent data with the use of the submitted customized key, and output means for outputting the extracted inherent data.

The present invention provides an information card system according to wherein the memory stores a password for permitting the information data to be read from the memory, and wherein the data processing terminal includes input means for submitting a password, password checking means for checking the submitted password against the password stored in the information card to permit the information data to be read from the memory, and output means for outputting the read information data.

The present invention provides an information card system wherein the extracted inherent data is wholly or partly checked against either inherent data read from a host or inherent data entered from an external source.

The present invention provides an information card or an information card system wherein the inherent data is embedded according to steganography by the steps of converting either image data or acoustic data, both formed as information data, to pure binary code data, or converting the pure binary code data to canonical gray code data, decomposing either the pure binary code data or the canonical gray code data into bit planes, segmenting the bit planes into regions according to a complexity measure, and replacing complex region-forming data with the inherent data.

The present invention provides an information card or an information card system, wherein the inherent data to be embedded is subject to a conjugation operation.

The present invention provides an information card or an information card system wherein the memory comprises an IC chip.

The present invention provides an information card or an information card system wherein the information card carries a photograph on a surface thereof, and either the information data or the inherent data is image data representing the photograph.

In the present invention, the information card contains the information data in the memory. The information data includes either image data or the acoustic data. The inherent data is embedded in the information data according to steganography. As a result, even if a third party is able to read the information data from the information card, since the inherent data is hidden in the information data according to steganography, the third party cannot recognize the presence of the inherent, secret data. Thus, it is possible to provide the information card with a high level of security. The information data may be of such a size as to allow the inherent data to be embedded therein according to steganography.

In the present invention, the inherent data shows either the legitimacy of the information card or the card owner of the information card. Once the inherent data is referred, it is easy to confirm and verify the legitimacy of the information card; i.e., to check for card forgery or modification. In addition, it is possible to hide the presence of such legitimacy data and card owner data.

In the present invention, since the memory contains the password for allowing the information data to be read from the memory, password checking can allow the information data to be read therefrom. Accordingly, the security of the stored information data can be made high.

In the present invention, the use of the customized key enables the inherent data to be extracted from the information data. The customized key is not stored in the information card, and hence can be made highly safe because this key cannot be stolen.

In the present invention, the information card contains the information data. The information data has the inherent data embedded therein according to steganography. The information card further stores a password for permitting the information data to be read from the memory. The data processing terminal checks a submitted password against the password stored in the information card. When the submitted password identifies with the stored password, then the data processing terminal permits the information data to be read from the information card, and then outputs such retrieved information data. For example, the read information data is displayed on a display unit, outputted as sounds, or transmitted as electronic data through a communication line.

As a consequence, the information data stored in the information card is protected against retrieval therefrom by password checking because no unauthorized persons are allowed to access it.

In the present invention, the information card retains the information data and the inherent data. The data processing terminal extracts the inherent data from the information data by means of a submitted customized key. The data processing terminal permits the inherent data to be extracted only when the submitted customized key is a legitimate customized key. Therefore, even if a third party is aware of the presence of the embedded inherent data, the third party can be prevented from extracting the inherent data because the third party does not know the customized key, and further cannot randomly submit any key that is identical to the legitimate customized key. Accordingly, the information card system provides a high level of security.

In the present invention, the information card contains the password other than the information data, called the inherent data. The data processing terminal protects the information data by password, and further protects the inherent data by customized key. As a result, the inherent data is protected against extraction by double protection scheme.

In the invention, the inherent data is read from the host and put into the data processing terminal, or is submitted from the external source into the data processing terminal. The read or submitted inherent data is wholly or partly checked against the inherent data that is contained in the information card. When these inherent data identify with one another, then the information card is possible to work as it is programmed. For example, it can function as a credit card. As a consequence, the information card system provides triple security, making it possible to eliminate forgery and illegal use.

In the present invention, the inherent data is embedded according to Steganography by the steps of converting the information data to pure binary code data, or converting the pure binary code data to canonical gray code data, decomposing the pure binary code data or the canonical gray code data into bit planes, and segmenting the bit planes into regions according to a complexity measure, and replacing complex region-forming data with the produced inherent data. As a result, the memory of the information card stores information data that has the inherent data embedded therein. In addition, the inherent data Is hidden so that the third parties are unaware of the presence of the inherent data.

In the present invention, the inherent data to be embedded is subject to a conjugate operation. As a result, various files can be embedded.

In the present invention, the memory of the information card includes an IC chip. As a consequence, it is possible to build an information card, which serves as, what is called, either a memory card or an IC card, and a system of such an information card. In this case, an inexpensive card reader/writer can be provided as the data processing terminal.

In the present invention, the information card carries a photograph on the card surface thereof. The information data or the inherent data represents the photograph. When image data is output and displayed, then such data can be checked against the photograph. This makes the information card highly secure.

DETAILED DESCRIPTION OF THE INVENTION

Figure 1:
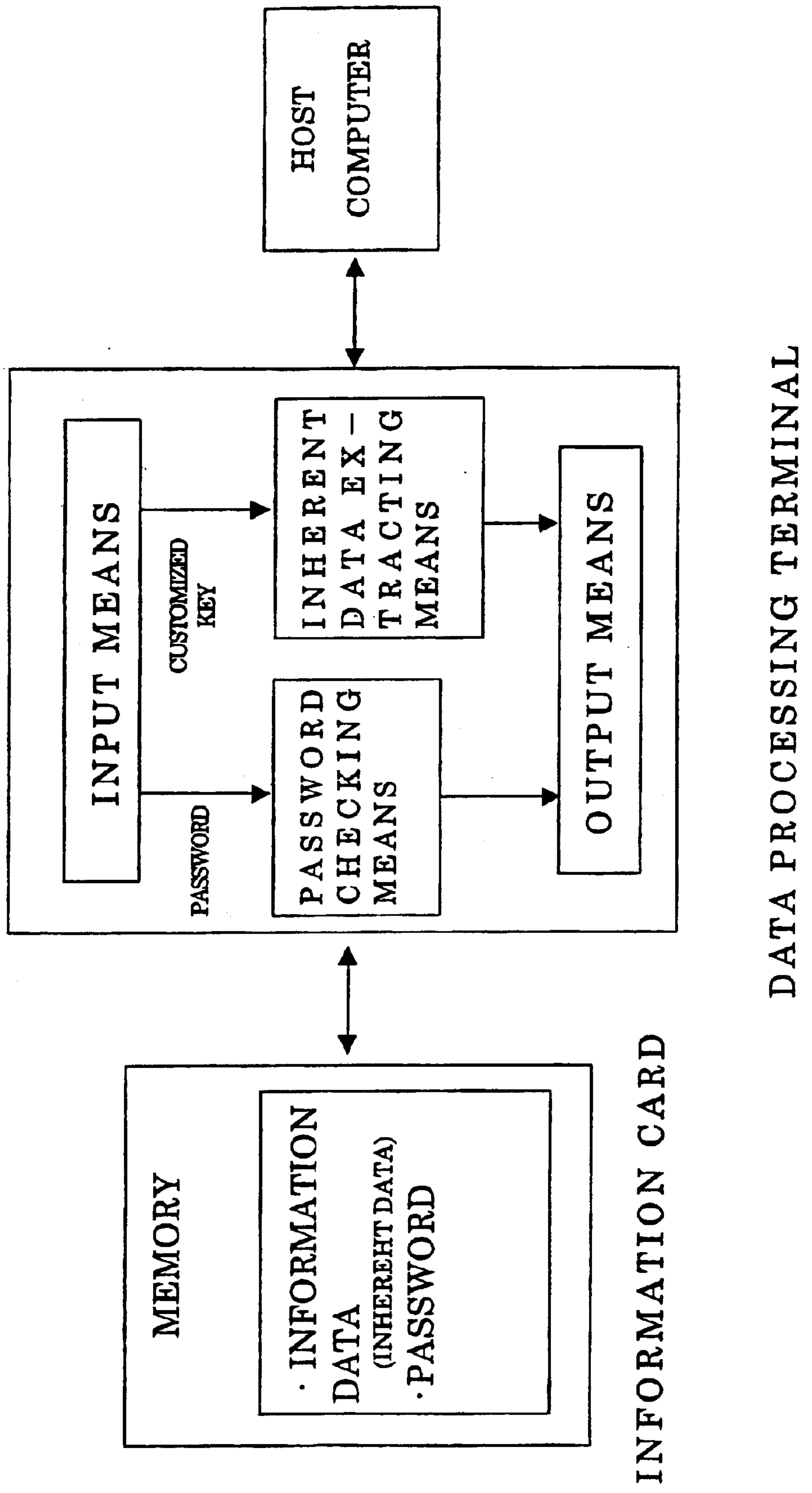
FIG. 1 is a block diagram, illustrating how an information card system according to the present invention functions.
Figure 2A:
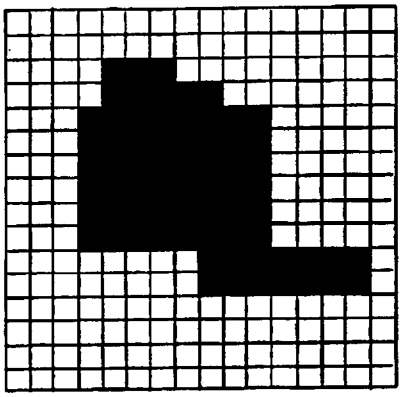
FIGS. 2(A) to 2(F) are simulative illustrations illustrative of a conjugation operation according to the present invention.
Figure 2B:
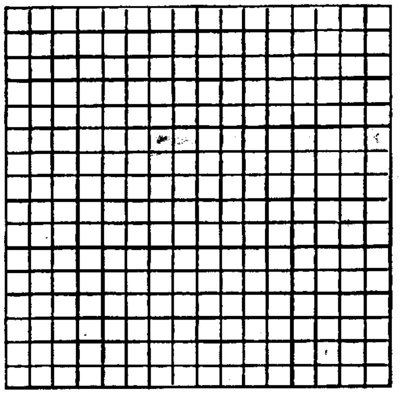
Figure 2C:
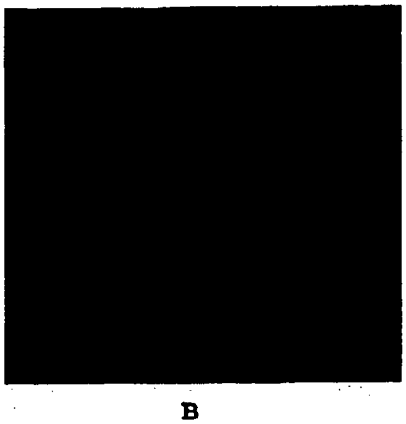
Figure 2D:
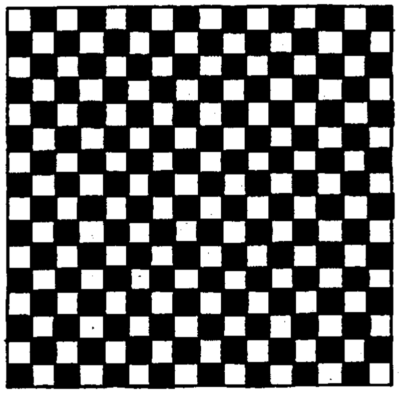
Figure 2E:
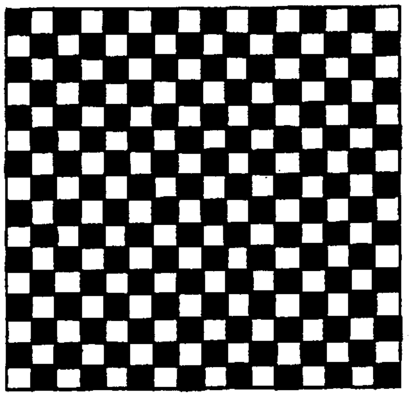
Figure 2F:
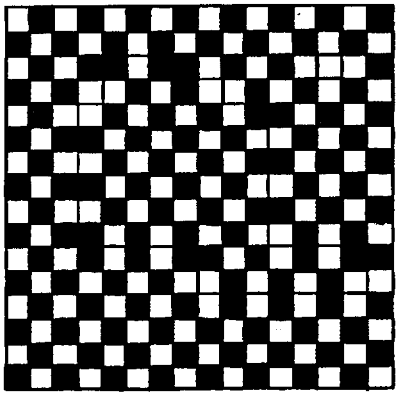

An information card system according to an embodiment of the present invention will now be described. FIG. 1 is a block diagram, showing the concept of the system according to the present invention. More specifically, the information card system includes an information card, a data processing terminal for exchanging data with the information card, and a host computer for exchanging data with the data processing terminal. The information card has a memory for storing data. The memory contains information data and a password. The information data has inherent data embedded therein by a steganographic process. The data processing terminal has input means, output means, password checking means, and inherent data extracting means.

According to the information card system, the data processing terminal can read the information data by password checking. It can also extract the inherent data using a customized key. As a result, when the information card is used as a credit card, it is possible to completely eliminate the illegal use of the information card by any person other than the legitimate card owner. Further, it is also possible to completely eliminate illegal use of a forged information card.

Since the inherent data is embedded in the information data according to Steganography (BPCSSteganography), it is possible to eliminate the card forgery and the inherent data extraction by unauthorized persons.

The BPCS-Steganography (Bit-Plane Complexity Segmentation Steganography) is a process of replacing (embedding) a random pattern of image data with secret data, in view of the complexity (randomness) of a binary pattern on a "bit plane" that is obtained, e.g., by slicing the image data into bits. Whereas a hiding capacity of a conventional steganographic process is in the range of 5 to 10%, the BPCS-Steganography has a hiding capacity of about 50% or up to some 70% in some cases. Therefore, the BPCS-Steganography is capable of hiding with a very high hiding capacity. The BPCS-Steganography is based on the following four basic ideas:

(1) Bit-plane decomposition is executed on a pure binary coded (PBC) image data or a "canonical gray coded (CGC) image converted from the PBC image data.

(2) A bit plane is segmented according to the "complexity measure" of a binary pattern, and a complex pattern (random pattern) is replaced by the secret data (i.e., the secret data is hidden). The secret data thus hidden is completely unnoticeable for human eyes.

(3) Files to be embedded are subject to a "conjugate operation", so that any types of files can be embedded.

(4) The algorithm of BPCS-Steganography (encoder and decoder programs) can be customized differently to different users. The customized BPCS-Steganography algorithm establishes the security of embedded information with the use of a "customized key" that is different from the password.

The most advantageous feature of the BPCS Steganography is that it can hide with a large hiding capacity. This feature is applicable to the following:

(A) Others do not become aware of that some secret data is embedded. It is also impossible to see any difference between a secret data-embedded image and a non-embedded image.

(B) Even if someone suspects that secret data might be embedded, he is unable to know, without a customized key, where and how the secret data can be extracted.

The information card system according to the present invention employs a steganographic card which has an IC memory mounted on a conventional card (with a photograph of the card owner thereon). The IC memory has a storage capacity of 8 KB or more. The steganographic card is used as follows:

(1) The IC memory stores the data of the photograph of the card owner. In order to read this data, the password for the card must be submitted to a card reader.

(2) The data of the photograph of the card owner contains personal data regarding the card owner (e.g., fingerprints, a personal history, data of relatives, data of hobbies, etc.). The personal data is embedded according to the BPCS-Steganography.

(3) In order to extract the embedded information display the extracted information on a display unit, it is necessary to submit a correct customized key. The customized key is defined as follows:

(a) Only the card owner knows a portion of the customized key (a private key).

(b) The remaining portion of the customized key (a company key) is strictly and confidentially managed only by the card company. Only when the card company receives an on-line request for the company key from a facility (shop) where the card is used, the card company encrypts the company key and sends the encrypted company key to the facility. In order to recover the embedded information, the private and company keys must be combined together.

(c) The card owner is unaware of the company customized key, while the card company is unaware of the private key.

In the information card system according to the present invention, there are four levels of security confirmation as to both a legitimate card owner and a legitimate card. Each security confirmation level is as follows:

(Level 1) Visual checking of the card user against the photograph on the card (in order to prevent stolen or found cards from being illegally used)

(Level 2) Requesting the card user to submit the "password", and visually checking the photograph data displayed on the display unit against the photograph on the card (in order to prevent photographs on cards from being forged).

(Level 3) Requesting the card user to submit the "private key", combining the private key with the "company key" that is sent on-line from the card company, and confirming whether the personal data embedded according to the BPCS-Steganography can be extracted (in order to prevent cards from being forged as a whole).

(Level 4) Checking the card user against the legitimate card owner based on the embedded personal data (e.g., fingerprints) (in order to prevent the legitimate card owner from renting the card to others)

Hiding and extraction of information according to the BPCS-Steganography will be described below.

On the bit planes of a natural image, a noise-like area does not appreciably affect the visual appearance to the viewer even if the data therein is replaced with other noise-like data. This phenomenon allows us to replace noise-like areas in a natural image with secret data. Since a criterion to determine whether the noise-like areas varies depending upon the natural image, it is necessary to establish a suitable threshold value for each natural image data.

When a binary image is analyzed by the local area of $2^m \times 2^m$ (normally m=3), and some area has a complexity measure value a which satisfies:

$$a_{th} < a$$

(where $a_{th}$ represents a threshold), then the area is decided as an area for secret data hiding or embedding.

In order to embed a secret data file in a natural image, the secret data file may be first divided into small file segments with $2^m \times 2^m$ size (i.e., $2^m \times 2^m$ pixel size), and then those small file segments may be embedded successively in noise-like areas of the same size in the image. However, not all small file segments have a complexity value greater than $a_{th}$. The small file segments having less complexity value than the threshold $a_{th}$ are converted to more complex segments by a conjugation operation described below. Such a process makes it possible to embed any secret files in images. However, in order to recover all parts of the embedded secret files, it is necessary to save the "conjugating map" which indicates the conjugated segment areas.

Now, assume that a white pixel has a value of 0, but a black pixel has a value of 1. P is assumed as an arbitrary binary image having white background. W is defined as a pattern where all pixels are white. B is taken as a pattern where all pixels are black. Wc is viewed as a checkerboard pattern where the leftmost pixel in the uppermost pixel row is white. Bc is taken as a checkerboard pattern where the leftmost pixel in the uppermost pixel row is black (See FIGS. 2*a*–2*f*). The binary image P is regarded as an image with a foreground area having the pattern B and a background area having the pattern W. On the basis of the above assumption, the "conjugated image" P* of the image-P is defined as follows:

$$P^* = P \oplus Wc$$

where $\oplus$ represents an exclusive-OR operation on each pixel.

A process for producing a conjugated image is referred to as a conjugation operation. The conjugated image P* is characterized as follows:

(1) The foreground area is identical in shape to the foreground area of the image P.

(2) The foreground area has the checkerboard pattern Bc.

(3) The background area has the checkerboard pattern Wc.

The image P and the conjugated image P* have one-to-one correspondence. The image P and the conjugated image P* satisfy the following properties:

(a) $(P^*)^* = P$ (b) $P^* \neq P$ (c) $a(P^*) = 1 - a(P)$ where "a(P)" represents complexity a of the image P.

The most important of the properties (a) through (c) is the property (c). The property (c) indicates that a simple image can be converted to a complex image or vise versa without losing its shape information. It is also possible to restore the original image from the converted image because of the property (a)

The BPCS-Steganography proposed by the present application includes the following five steps:

Step 1:

A natural image of $2^M \times 2^M$, N bits/pixel is converted to an N-bit gray code image. This conversion step is based on the study by Eiji Kawaguchi et al. of binary images produced by bit-plane decomposition and their complexity.

Step 2

The gray code image generation in Step 1 is segmented into N binary images by bit-plane decomposition.

Step 3

Each of the N binary images is divided into partial images each having a size of $2^m \times 2^m$. The partial images are represented by $P_i$; i=1, 2, . . . $4^{M-m}$. The nth bit-plane image can be expressed by:

$$I_n = \{P_1^n, P_2^n, \ldots, P_{4^{M-m}}^n\}$$

Similarly, the nth "conjugation map" can be expressed as follows:

$$C_n = \{Q_1^n, Q_2^n, \ldots, Q4^n_{M-m}\}$$

where each of $Q_1^n$, $Q_2^n$, . . . , $Q4^n_{M-m}$ has a value of "0" or "1". The value of "1" represents an area where the conjugation operation is applied. The value of "0" represents an area where the conjugation operation is not applied.

Embedded data (expressed by E) includes a header, a body, and a pad. The header indicates a data size of the body. The body represents secret data (e.g., a secret image) which is embedded. The pad serves to shape the embedded data into the size of $2^m \times 2^m$. $E_j$ (j=1, 2, . . . ,J) represents a partial bit series of the embedded data E whose size is a $2^m \times 2^m$ bits. When the partial bit series $E_j$ is corresponded to a square area of $2^m \times 2^m$ bit by bit, based on the principle of raster scanning, then a binary image of $2^m \times 2^m$ can be generated. The generated binary image is represented by makeS($E_j$).

With the threshold $a_{TH}$ used, an embedding algorithm can be expressed below. Each Q in the nth conjugation map $C_n$ is initialized to "0".

```
for (n=N, J=1;n≧1&&j<J;n–) {
for (i=1;i≧4^(M–m)&&j<J;i++) {
if (a(P_i^n)≦a_TH) {
if (a(makeS(E_j))≦a_TH)
P_i^n=makeS(E_j)
else {
P_i^n=makeS(E_j)*
Q_i^n="1"
}
j++
```

Since low-order bits are less significant on the image, the embedding process is carried out on bits successively from the least significant bit. When the binary image makeS ($E_j$) in an area is simple, i.e., when the complexity of the area is smaller than the threshold, then the conjugation operation is effected on the binary image makeS ($E_j$). In this case, $Q_j$ in the conjugated map is set to "1".

Step 4

The N-bit gray code image is reconstructed from the N binary images where the secret data is embedded.

Step 5

After the N bit pure binary code is recovered from the N-bit gray code image in Step 4, the image data file having the secret data embedded therein is obtained.

The secret data embedded in an image may be recovered by the above algorithm being reversed. In order to recover the secret data from the embedded image, it is necessary to known the threshold $a_{TH}$ and the conjugation map.

Figure 3:
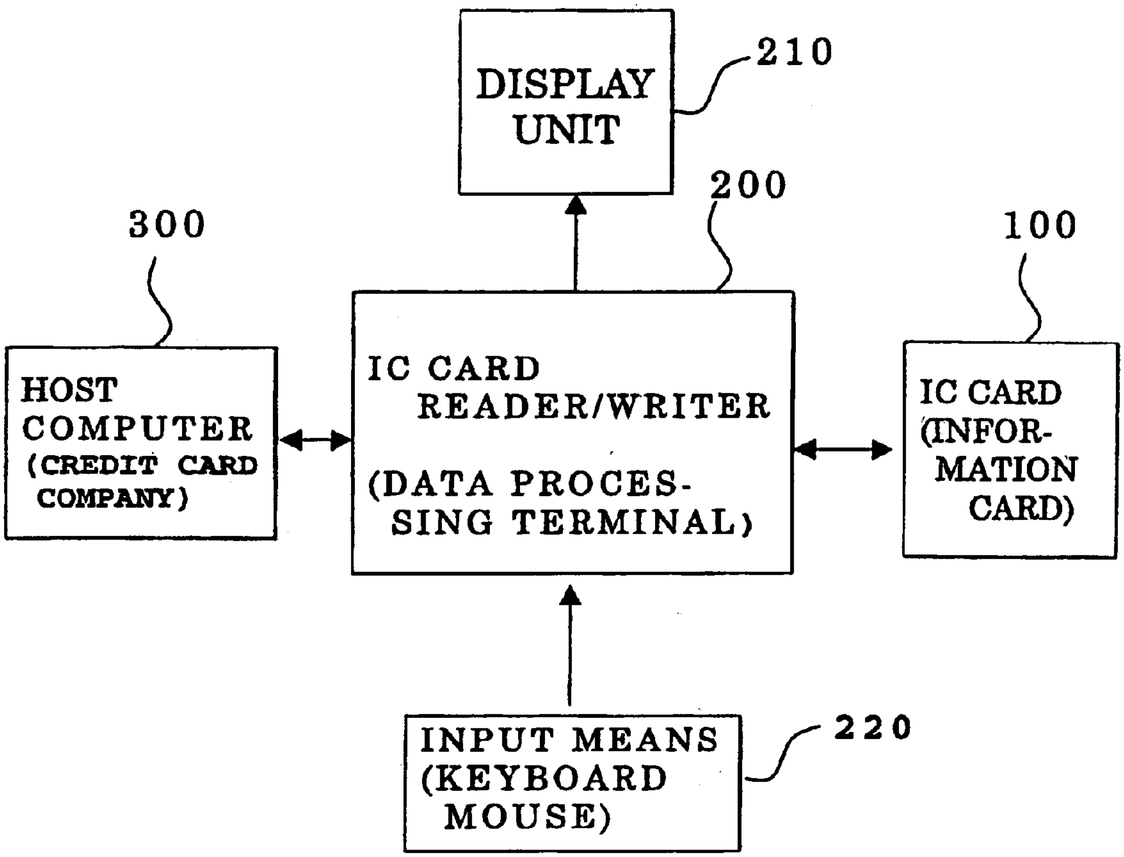
FIG. 3 is a block diagram, showing an information card system according to an embodiment of the present invention.
Figure 4:
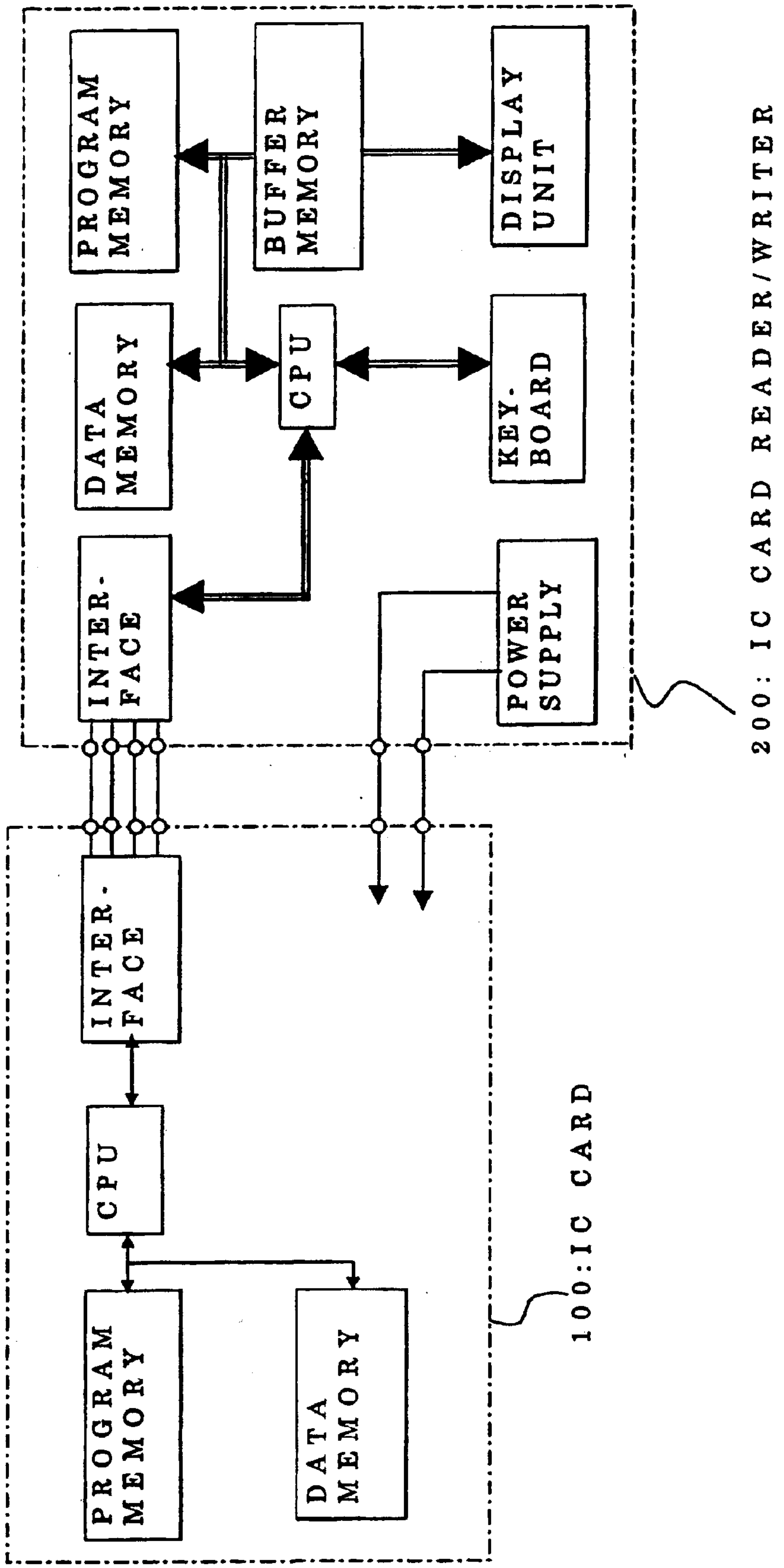
FIG. 4 is a block diagram, showing how the information card system according to the embodiment is electrically constructed.
Figure 5:
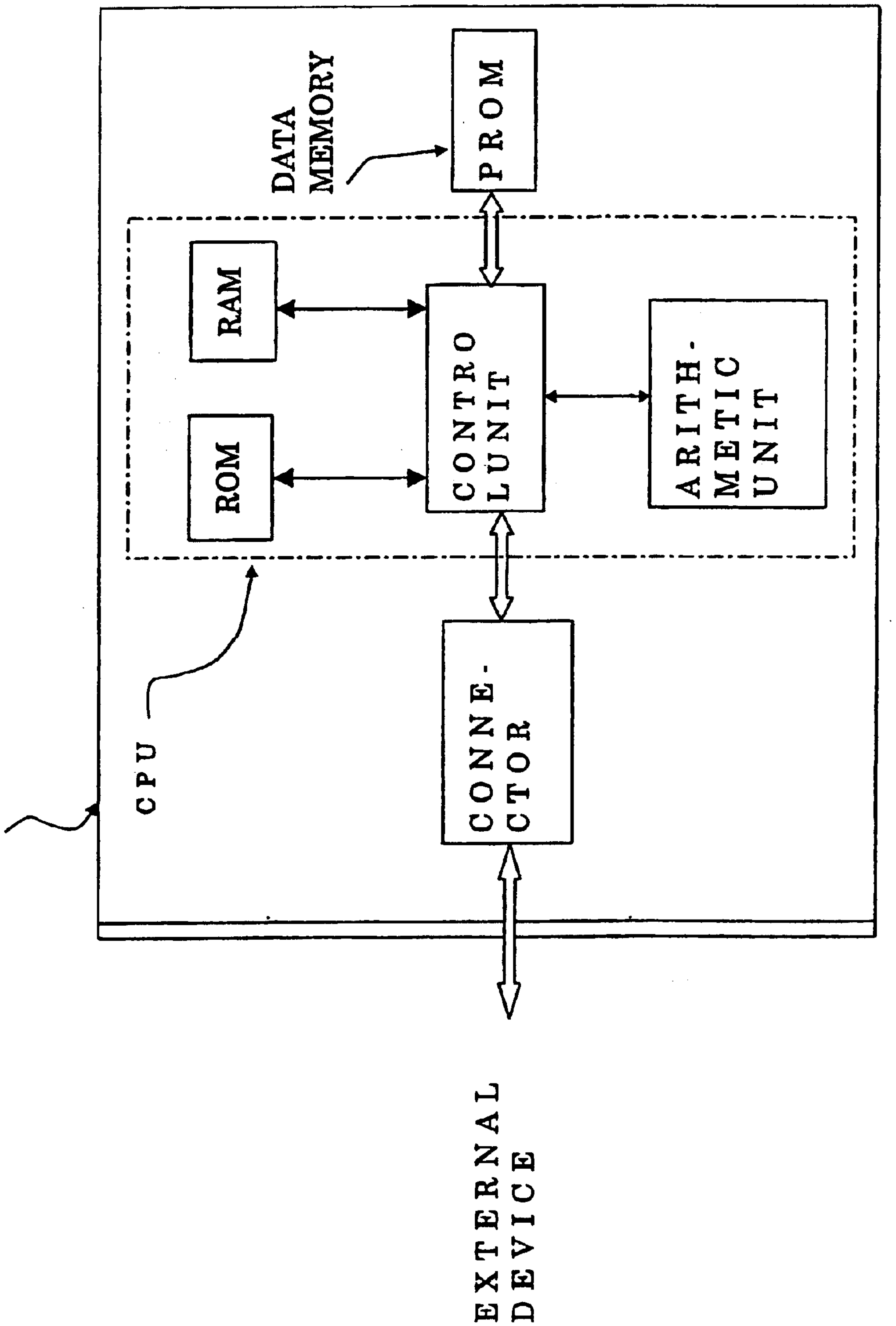
FIG. 5 is a block diagram, illustrating how an information card according to the embodiment is electrically constructed.
Figure 6:
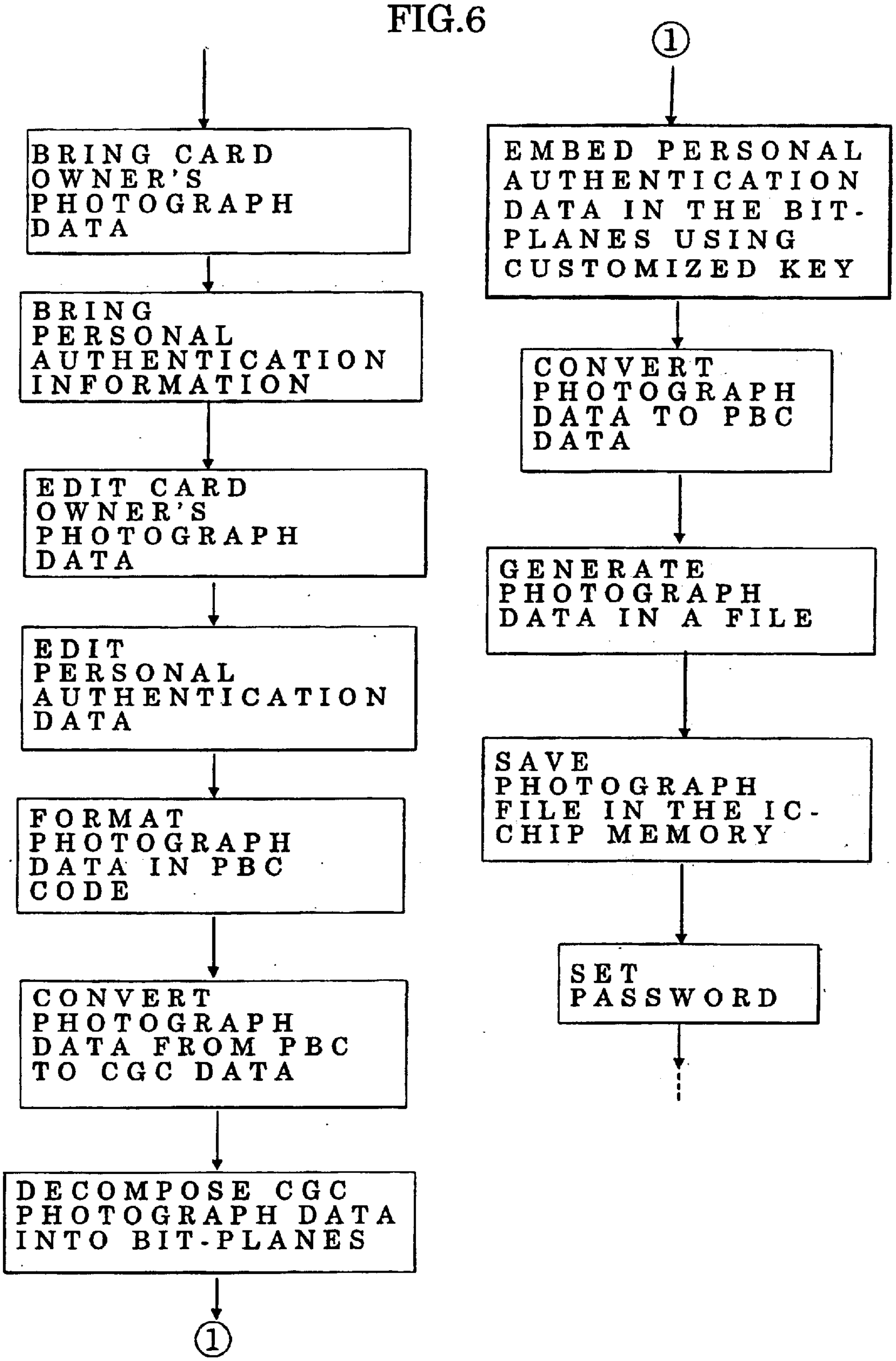
FIG. 6 is a flowchart, showing an embedding process (encoder program) in the information card system according to the embodiment.
Figure 7:
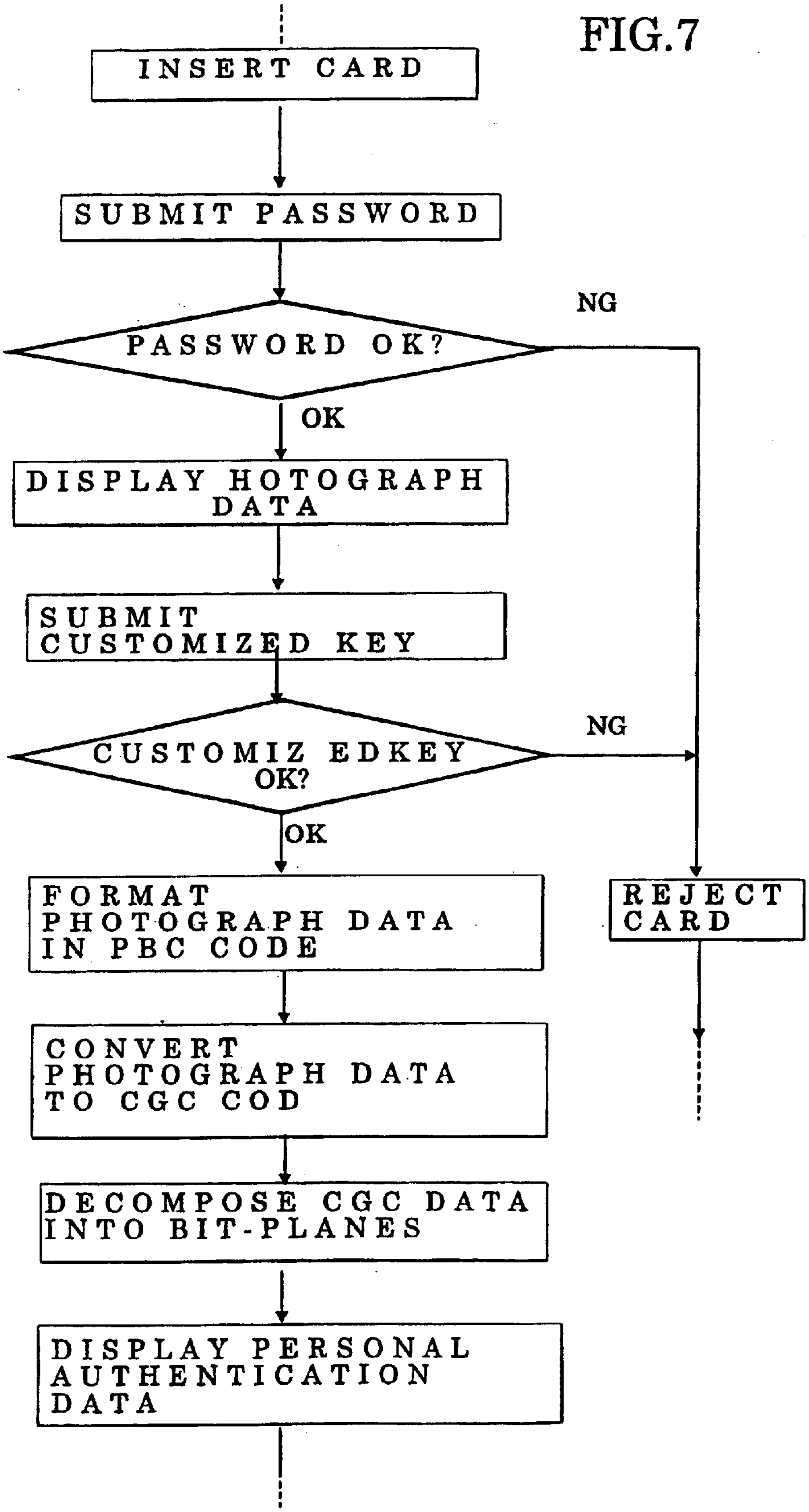
FIG. 7 is a flowchart, showing an authentication process (decoder program) in the information card system according to the embodiment.

Next, an IC card system according to an embodiment of the present invention will be described with reference to FIGS. 3 to 7. FIG. 3 is a block diagram, showing the concept of the IC card system. FIG. 4 is a block diagram, illustrating a schematic structure of an IC card and an IC card reader/writer in the ID card system. FIG. 5 is a block diagram, illustrating another structural example of an IC card. FIGS. 6 and 7 are flowcharts, showing programs to be executed in the ID card system.

As shown in the above Figures, an IC card 100 as an information card according to the present invention is capable of exchanging data with an IC card reader/writer (data processing terminal)200. The IC card reader/writer 200 can exchange data-on-line with, e.g., a host computer 300 at a credit card company. The IC card reader/writer 200 may be equipped with a display unit 210 (display means) and an input means 220 (such as a mouse and a keyboard).

As shown in FIG. 4, the IC card reader/writer 200 includes a CPU to execute arithmetic operation processing, a data memory for storing data, a program memory for storing programs, a buffer memory, the keyboard for entering data, a display unit for displaying results of the arithmetic operation processing, an interface for controlling data exchanged with the IC card, and a power supply.

The IC card reader/writer 200 is able to read data from and write data in the IC card 100. The CPU executes encrypting and decrypting processes and an authentication process. The program memory stores application programs.

The IC card 100 has an interface, a CPU, a program memory, and a data memory. The power supply of the IC card reader/writer 200 supplies electric power to the IC card 100.

The program memories and the data memories are nonvolatile types. These nonvolatile memories include EEPROMs that is electrically erasable, or static RAMs that is backed up by a battery.

FIG. 5 shows another structural example of an IC card. More specifically, the IC card includes a CPU, a PROM for storing data, and a connector for connection to an external device (an IC card reader/writer). The CPU includes a control unit, an arithmetic unit, a ROM, and a RAM.

The IC card includes an IC chip that is mounted on a plastic plate member. The plastic plate member carries the name of the card owner, the card number, and an expiration date, all of which are embossed on a surface thereof.

The IC chip stores, in a memory thereof having a storage capacity of 8 kB or more, password data, digital image data of the card owner's photograph or digital acoustic data (information data). The information data contains personal data of the card owner (e.g.; fingerprints), a photograph of the card owner, and part of the personal data (digital signature image data), all of which are embedded according to the BPCS-Steganography.

The IC card system enables both visual verification of the card user and mechanical authentication of the IC card at one time. People cannot perceive any secret present in the IC card. Even if someone suspects some secret data as being present in the IC card, they cannot extract such an embedded data from the IC card. The IC card may hide digital data or authentication data. The IC card system can properly readout such hidden authentication data from the IC card, and properly can embed the same data therein.

FIG. 6 shows a process (encoder program) in which data is stored in the IC card according to Steganography. Initially, the card owner's photograph data (including indexed photograph data) is produced in order to be written to the IC card memory (8 KB or more). The produced photograph data is saved as a bit map file. In this case, the photograph data is set in size to be some 75% of the IC card memory. In addition, the above photograph data is produced from the photograph data of the IC card owner.

Then, personal authentication data (text data) is produced and then saved in order to be embedded in the photograph data. The text data is set in size to occupy some 10% of the photograph data. Both of the photograph data and the authentication data are selected and displayed. Then, the photograph data for the IC card is converted to pure binary code (PBC) data. The photograph data thus converted to the PBC data is then converted to canonical gray code (CGC) data.

Next, the photograph data thus converted to the CGC data is decomposed into bit planes (i.e., into N binary images). The personal authentication data (text data) is embedded in the bit-plane-decomposed photograph data. In this case, the personal authentication data is embedded according to the above algorithm, using a customized key (which consists of, e.g., 24 digits of data).

The photograph data having the embedded text data therein is then re-converted to PBC data. Further, the photograph data for use in the IC card is produced and then saved.

Now, the IC card is inserted into the IC card reader/writer, and then any one of the photograph data is selected. Then, the selected photograph data is transferred and saved in the IC card memory. In order to protect the saved photograph data, a password is set and saved in the IC card memory. The password consists of, e.g. 4 digits of data.

The IC card (for use as, e.g., an identification card) is now completed. Thereafter, a photograph of the card owner is printed out on the plastic plate surface of the IC card.

Next, the authentication of the IC card will be described with reference to FIG. 7. FIG. 7 shows part of a decoder program.

Initially, the IC card is inserted into the IC card reader/writer. Then, the IC card reader/writer starts an initializing process in order to execute an authentication flow. Next, a password is submitted from a keyboard into the IC card reader/writer. The IC card reader/writer compares the submitted password with the stored password in the memory on the IC card. When the submitted password identifies with the stored password, then the IC card reader/writer reads the photograph data (information data) stored in the IC cardmemory, and displays it on the display unit. When the displayed photograph data indicates a photograph of the card-owner, then the displayed photograph is visually checked against the photograph printed on the IC card surface and against the card user himself.

Then, a customized key is submitted. The customized key is used to embed the personal authentication data. The customized key is known only to the legitimate card owner. The customized key is not stored in the IC card memory. The customized key works as parameters to control over embedding and extracting of the inherent data. The inherent data is extracted from the information data only when the customized key submitted to extract the inherent data identifies with parameters that are used for embedding.

More specifically, the photograph data (information data) read from the IC card memory is converted to pure binary code (PBC) data, and then the photograph data thus converted to the PBC data is converted to canonical gray code (CGC) data. The CGC data of the photograph is decomposed into bit-planes. At this time, the personal authentication data is extracted from the photograph data already decomposed into the bit planes; using the customized key. In this manner, the embedded personal authentication data (text data) is extracted from the photograph data, and is then displayed.

When the submitted password does not identify with the password in the IC card memory, then no photograph data can be read from the IC card memory. Further, when the submitted customized key does not identify with the card owner's customized key, then the personal authentication data cannot be extracted from the photograph data. In case such a password or customized key is incorrect, then the IC card is rejected or confiscated by the IC card reader/writer as being forged or illegally used.

In conclusion, the IC card system is designed to execute password checking after visually checking is made as to where a card user is an authorized card owner, and then to allow the photograph data to be read from the IC card memory and the photograph image to be displayed on the basis of the photograph data. The displayed photograph image is compared with the photograph printed on the IC card, thereby checking the legitimacy of the IC card. Then, the personal authentication data is extracted from the photograph data using a customized key. The extracted data is then displayed. The displayed personal data is compared with the card user's personal data, thereby confirming that the present IC card is a legitimate card.

As evidenced by the above, apparent image data contains other image data, acoustic data, and text data, all of which are present in a visually imperceptible manner.

These embedded data are checked to confirm that the card user and the card are both legitimate.

Pursuant to the present invention, since the third party cannot recognize the presence of the inherent data, or rather the secret data, the information card with a high level of security is achievable.

According to the present invention, the inherent data is possible to verify the legitimacy of the information card. It is possible to hide the presence of the legitimacy data and the card owner data.

According to the present invention, the password enables protection of the information data, with a consequential increase in security of the card.

According to the present invention, the customized key can protect the inherent data.

According to the present invention, the information data can be protected against retrieval by password checking.

According to the present invention, unauthorized persons can be prevented from extracting the inherent data, thereby providing a high level of security.

Pursuant to the present invention, the information card can be prevented from being illegally used by means of the password and customized key.

Pursuant to the present invention, it is possible to provide triple security, and thus to eliminate forgery and illegal use of the information card.

According to the present invention, the inherent data is embedded according to steganography, and is thus difficult to decrypt. As a result, the inherent data can securely be hidden.

According to the present invention, various files can be embedded in the inherent data.

According to the present invention, it is possible to construct an information card, which works as a memory card or an IC card, and a system of such an information card. In addition, an inexpensive card reader/writer can be provided.

Finally, pursuant to the present invention, the image data can be checked against the photograph. The photograph can be prevented from being forged.

What is claimed is:

1. An information card comprising a visible photograph of a card owner displayed upon the card and a memory that stores information data, the information data comprising one of image data and acoustic data;

wherein the information data contains inherent data that is embedded in the information data according to steganographic information hiding;

wherein the inherent data comprises data that authenticates a legitimacy of a card owner of the information card; and wherein one of the information data and the inherent data comprises a reproduction of the visible photograph of the card owner displayed upon the card.

2. The information card according to claim 1, wherein the inherent data further comprises data that authenticates a legitimacy of the information card.

3. The information card according to claim 1 wherein the memory stores a password for permitting the information data to be read from the memory.

4. The information card according to claim 1, wherein the information card employs a customized key in order to give a permission to extract the inherent data from the information data.

5. The information card according to claim 1, wherein the memory comprises an IC chip.

6. An information card system comprising:

an information card comprising a memory that stores information data, the information data comprising one of image data and acoustic data, wherein the information data comprises inherent data that is embedded in the information data according to steganographic information hiding, wherein the inherent data comprises data that authenticates a legitimacy of a card owner of the information card, and wherein the memory stores a password for permitting the information data to be read from the memory, and a data processing terminal comprising input means for submitting a password, password checking means for checking the submitted password against the password stored in the information card to permit the information data to be read from the memory, and output means for outputting the read information data.

7. The information card system according to claim 6, wherein said data terminal further comprises input means for submitting a customized key, and inherent data extracting means for extracting the inherent data with the use of the submitted customized key, and an output means for outputting the extracted information data.

8. The information card system according to claim 7, wherein the extracted inherent data is at least partly checked against one of inherent data read from a host and inherent data entered from an external source.

9. The information card system according to claim 6, wherein said system further comprises a means for embedding the inherent data, said means for embedding comprising:

at least one of a means for converting one of image data and acoustic data to pure binary code data, and a means for converting the pure binary code data to canonical gray code data;

means for decomposing one of the pure binary code data and the canonical gray code data into bit planes;

means for segmenting the bit planes into regions according to a complexity measure, and means for replacing complex region-forming data with the inherent data.

10. The information card system according to claim 9, wherein the means for embedding the inherent data further comprises means for performing a conjugation operation upon the inherent data.

11. The information card system according to claim 6, wherein the memory comprises an integrated circuit chip.

12. The information card system according to claim 6, wherein the information card carries a photograph on a surface thereof, and one of the information data and the inherent data is image data representing the photograph.

13. An information card system comprising:

an information card comprising a visible photograph of a card owner displayed upon the card and a memory that stores information data, wherein the information data comprises one of image data and acoustic data, wherein the information data comprises inherent data that is embedded in the information data according to steganographic information hiding, wherein one of the information data and the inherent data comprises a reproduction of the visible photograph of the card owner displayed upon the card; and a data processing terminal comprising input means for submitting a customized key inherent data extracting means for extracting the inherent data with the use of the submitted customized key, and output means for outputting the extracted inherent data.

14. The information card system according to claim 13, wherein the memory stores a password for permitting the information data to be read from the memory, and wherein the data processing terminal comprises input means for submitting a password, password checking means for checking the submitted password against the password stored in the information card to permit the information data to be read from the memory, and output means for outputting the reading formation data.

15. The information card system according to claim 14, wherein the extracted inherent data is at least partly checked against one of inherent data read from a host and inherent data entered from an external source.

16. The information card system according to claim 13, wherein said system further comprises a means for embedding the inherent data, said means for embedding comprising:

at least one of a means for converting one of image data and acoustic data to pure binary code data, and a means for converting the pure binary code data to canonical gray code data;

means for decomposing one of the pure binary code data and the canonical gray code data into bit planes;

means for segmenting the bit planes into regions according to a complexity measure, and means for replacing complex region-forming data with the inherent data.

17. The information card system according to claim 16, wherein the means for embedding the inherent data further comprises means for performing a conjugation operation upon the inherent data.

18. The information card system according to claim 13, wherein the memory comprises an integrated circuit chip.

* * * * *